Dec. 4, 1962   J. W. TILEY ETAL   3,067,114
SEMICONDUCTIVE DEVICES AND METHODS FOR THE FABRICATION THEREOF
Filed Dec. 3, 1954   3 Sheets-Sheet 2

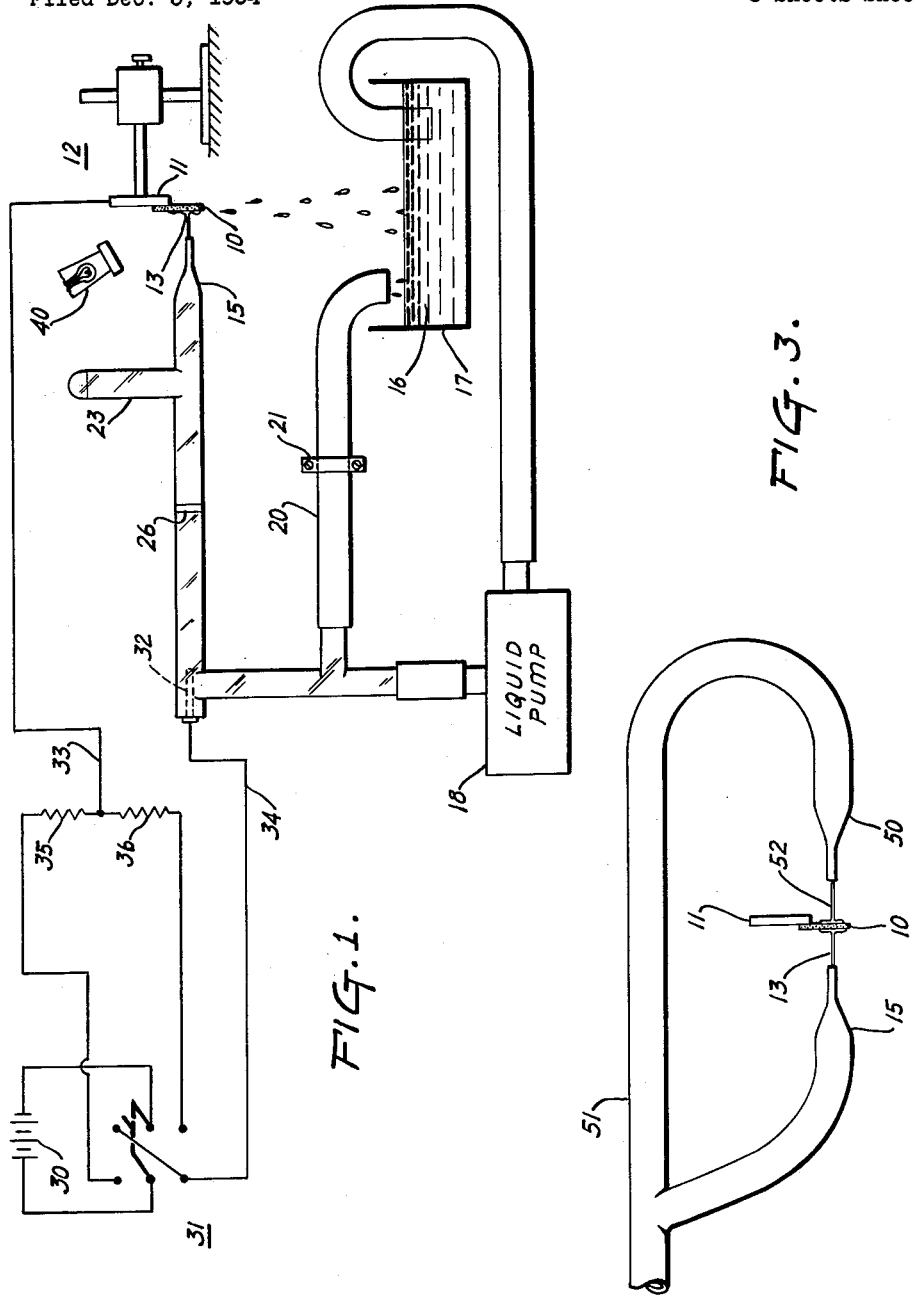

INVENTORS
JOHN W. TILEY
RICHARD A. WILLIAMS
BY
ATTORNEY

Dec. 4, 1962 J. W. TILEY ETAL 3,067,114
SEMICONDUCTIVE DEVICES AND METHODS FOR THE FABRICATION THEREOF
Filed Dec. 3, 1954 3 Sheets-Sheet 3

INVENTORS
JOHN W. TILEY
RICHARD A. WILLIAMS
BY
ATTORNEY

United States Patent Office 3,067,114
Patented Dec. 4, 1962

3,067,114
SEMICONDUCTIVE DEVICES AND METHODS FOR THE FABRICATION THEREOF
John W. Tiley, Hatboro, Pa., and Richard A. Williams, Collingswood, N.J., assignors, by mesne assignments, to Philco Corporation, Philadelphia, Pa., a corporation of Delaware
Filed Dec. 3, 1954, Ser. No. 472,824
20 Claims. (Cl. 204—143)

This invention relates to semiconductive devices and to methods for making them. More particularly it relates to improved methods for producing semiconductive structures and conductive contacts thereto, whereby the configurations of the structures and/or the contacts may be accurately and readily controlled. This application is a continuation-in-part of our application Serial No. 395,756, filed December 2, 1953 and now abandoned, and entitled Semiconductive Devices and Methods for the Fabrication Thereof.

In the field of semiconductive devices it has become highly important to be able to provide readily and consistently semiconductive bodies of predetermined critical configurations, and also to be able to provide conductive contacts or deposits of accurately controlled locations and configurations upon such bodies. In many important applications the nature of the contact between the conductive and the semiconductive material is also significant.

For example, in our copending application No. 472,826, filed December 3, 1954, now U.S. Patent No. 2,885,571, and entitled "Electrical Device," there is described a semiconductive amplifier employing a pair of metallic contacts to opposite sides of an extremely thin, substantially plane-parallel region of a semiconductive wafer; typically the contacts may have a diameter of about 2 mils, while the plane-parallel region of the semiconductor between the contacts is preferably of the order of 0.2 mil thick to provide satisfactorily high gain and extended high-frequency response. The metallic contacts in this instance are designated area-contacts, indicating intimate, substantially stressless engagements of clean, undisturbed semiconductive surfaces by the overlying metallic substances, and this type of device will therefore be referred to hereinafter as the area-contact amplifier. Realizing that in this device the diameter of each electrode is less than that of a human hair while the thickness of the plane-parallel region between the electrodes is ten times smaller again, it is apparent that microscopically precise techniques of semiconductor shaping and electrode application are necessary. The problem is even more difficult than would appear from a consideration of the dimensions alone, since there exists the further limitation that the semiconductor surface produced by the shaping operations should be clean, smooth and undisturbed, while the application of the electrode materials should be such that fracturing or even stressing of the thin laminal region of semiconductor is avoided. Thermal stresses in the semiconductor are also to be avoided since they may produce anomalous effects upon electrical performance.

Similar problems of precise fabrication arise in connection with embodiments of the alloyed or diffused-junction transistor intended for high-frequency use, in which an impurity metal is diffused into both sides of a plane-parallel body of semiconductor which, for best high-frequency operation, must be made very thin. In this instance it is a further desideratum to apply the impurity metal to the prescribed region in such a way that it tends to wet and alloy with the prescribed region of semiconductor when heated, instead of contracting into a ball upon heating.

As another example, the so-called analogue or mono-polar transistor may also be greatly improved by the provision of a method for the accurate shaping of the semiconductor and of those contacts thereto commonly designated the gate electrodes, to which the current-controlling voltages are normally applied. In this device, current from one electrode, designated the source, is constrained to flow through a semiconductive body to another electrode, designated the drain, by a restricted path which runs immediately adjacent a back-biased rectifying surface or group of surfaces called the gate. The gate may conventionally comprise a pair of P-N junctions diffused into the semiconductor from opposite sides until only a very thin region remains therebetween, each junction extending laterally entirely across the semiconductor between the source electrode and the drain electrode. By biasing the gate in the reverse direction, a depletion region deficient in current carriers is produced in the semiconductor immediately adjacent the junction surfaces, the depth of the depletion layer being variable in response to the gate voltage. These variations in depletion layer depth represent changes in the conductivity of the path of current from source to drain, and, if the thickness of the semiconductive region between the two P-N junctions is made sufficiently small, power gain between gate and drain may exist. Due to the difficulty of controlling accurately the diffusion process, the desired close spacings of the diffused junctions are best obtained by first providing a thin region of semiconductor upon which the metal to be diffused is placed. The fabrication problems are therefore similar to those in the alloyed ambipolar junction transistor described hereinbefore.

As will be described in detail hereinafter, we have also found that an analogue transistor may employ rectifying area-contacts in place of the P-N junctions forming the gate, in which case the problem of providing a very small spacing between the rectifying surfaces of the gate becomes one of providing a very thin region of semiconductor and applying rectifying area-contacts to opposite surfaces thereof. The gain of the resulting device then depends upon the degree to which the semiconductor shaping and electrode application may be accurately controlled.

In addition, methods for providing accurately controlled delineation of an unstressed semiconductive body make possible production of special shapes of semiconductive devices which may be suited for convenient mounting in particular applications, or for easy handling or processing. Similarly, convenient methods for the controlled application of metallic electrodes to semiconductive surfaces may also be of use in providing substantially ohmic connections to semiconductors, as for the base connection of an ambipolar transistor for example.

From the foregoing and similar considerations it will therefore be apparent that a serious and important problem in the field of semiconductive circuit devices is to provide sufficiently precise and accurate methods for shaping semiconductive materials and for applying metallic materials thereto. It is obvious that, in addition to precision, convenience, flexibility and low cost are other desirable and important characteristics of such methods if they are to be of a greatest commercial value.

Accordingly it is an object of our invention to provide a new and improved method for fabricating semiconductive structures and devices.

Another object is to provide a method for producing predetermined configurations of semiconductive materials with a high degree of accuracy.

Another object is to provide a method for producing semiconductive bodies having accurately-controlled surface configurations substantially free from undesired stresses or distortions.

Still another object is to provide such a method which is convenient and flexible in its application.

More specific objects are to provide improved methods for producing extremely thin semiconductive bodies having substantially plane-parallel surfaces, for producing substantially flat-bottomed pits or grooves of accurately-controlled depths in such bodies, and for producing these structures without introducing substantial stresses or surface disturbances into the material thereof.

A further object is to provide a method of producing contacts of predetermined precise configurations between metallic and semiconductive materials.

It is another object to provide an improved method for depositing a conductive area-contact in intimate engagement with the exterior surface of a semiconductive body.

Still another object is to provide an improved method for fabricating semiconductive rectifying devices.

A still further object is to provide an improved method for producing contacts of small dimension between metals and semiconductive bodies.

Another object is to provide an improved method for producing semiconductive amplifiers, and especially such amplifiers adapted for use with high-frequency signals.

It is another object to provide an improved method for producing junction transistors, analogue transistors, area-contact amplifiers or other semiconductive devices in which the configuration and nature of the semiconductor and/or metallic contacts thereto are of importance.

A further object is to provide a method for fabricating semiconductive amplifiers of improved alpha-cutoff frequency and low base resistance.

Still another object is to provide a variety of new and useful semiconductive devices of improved characteristics.

In accordance with our invention, the above objects are realized in the following manner. A stream or jet of a suitable electrolyte is directed against a body of semiconductive material while an electrical current is passed between the stream and the semiconductor. To shape semiconductive materials, the electrolyte is one which is an electrolytic etchant for that material when the electric current is of the proper polarity, while, to apply conductive electrodes, the electrolyte should be one which provides electro-deposition of a conductive material with the appropriate polarity of electrolytic current. In some cases the electrolyte may be so chosen as to be an etchant of the semiconductive material for one polarity of electric current and a plating solution for the opposite current polarity, so that the time between etching and plating may be accurately controlled.

In some instances we employ relative motion between the electrolytic stream and the semiconductive material to produce various configurations of material or of conductive contacts, and in other instances we may vary the size, shape or composition of the stream to obtain the desired metal and semiconductor configurations. Sequential or simultaneous applications of a plurality of electrolytic streams are also employed where advantageous. By our method, extremely accurate yet simple control of the geometry of semiconductive materials and conductive contacts thereto is provided, while mechanical or thermal distortions or stresses of the semiconductive material are avoided substantially completely.

We have found that to obtain such localization of etching as is desired for accurate delineation of the surface contours of a semiconductive body, the etching current flowing between the electrolyte and the semiconductor must be greater near the center of the region of jet impingement than at surface points more remote from the center of the jet. The desired concentration of etching current is obtained when the total resistance for etching current in a series path from the negative electrode in the electrolytic jet, through a surface region near the center of the jet, and thence to the current-supplying electrode in contact with the semiconductor, is small compared with the resistance for etching current flowing from the negative electrode, through the jet, and thence laterally along the layer of electrolyte on the surface to a surface point remote from the center of the jet, before proceeding through the surface and to the positive electrode. The difference in resistance for the two types of paths, in the case of a substantially uniform semiconductive body, is therefore that due to differences in the distance of lateral electric-current flow through the surface layer of electrolyte. When the difference in resistance per unit of displacement from the center of the jet is sufficiently large, strong localization of the etching action to the region under or near the jet may be obtained. This condition is obtained when the resistivity of the electrolyte is made sufficiently high. However, we have further found that the lateral distribution of etching current depends not on the absolute values of the differences in resistance for points differently displaced from the center of the jet, but upon the ratio of such differences to the total resistance for etching current flowing between anode and cathode.

For example, if the resistance encountered by the etching current in flowing into the body and to the anode is extremely large, substantial differences in the resistances encountered in flowing different distances in the electrolyte will not be sufficient to produce localization of etching. The resistivity of the electrolyte must therefore be selected in accordance with the total resistance to etching current flow. We have found that unless the resistivity of the electrolyte is greater than the bulk resistivity of the semiconducor, substantially no localization of the etch is obtained, and that for well-defined etching action such as will permit accurate surface delineation of the preferred type, the resistivity of the electrolyte is preferably at least two to five times greater than that of the bulk of the semiconductor.

Although the above relation between the resistivity of the electrolyte and the bulk resistivity of the semiconductor has been found necessary to obtain the advantages of localized etching by means of an electrolytic jet, the exact value required will in general depend upon the semiconductive properties of the body to be etched. In particular, the conductivity type and degree of irradiation of the semiconductive body will affect the exact ratio of resistivities required. For example, when jet-etching N-type germanium with low illumination, the ratio $Re/Rs$ of the resistivity of the electrolyte to the bulk resistivity of the semiconductor required for localized etching may typically be as high as four. This phenomenon we believe arises from the fact that the atoms of the semiconductor are difficult to remove from the body and to place in solution unless a substantial number of "holes," i.e. absences of electrons from the valence band of the material, exist at the surface of the semiconductor. Such holes present at the surface correspond to broken valence bands in the semiconductor, which weaken the forces tending to hold the atoms in the solid state. Unless the supply of holes is sufficient to permit ready etching, the etching current is limited principally by the lack of holes, and differences in current path-lengths in the electrolyte are therefore of less significance in determining the lateral distribution of etching current.

Stated somewhat differently, the ratio of the voltage across the interface between the semiconductor and the electrolyte, to the current carried by atoms going into solution, may be considered to define a resistance of the surface to etching current, which for convenience may be designated the surface etching resistance of the semiconductor. The total resistance of current paths passing through the surface to the positive electrode is therefore due not only to the bulk resistivity of the semiconductor but also to the etching resistance of the surface. The surface etching resistance in turn depends upon the rate at which holes are supplied to the surface, and for low-resistivity P-type semiconductors in which the normal density and mobility of holes is great, or for other types of semiconductors which are appropriately irradiated at the etching surface so as to generate large numbers of hole-electron pairs therein, the surface etching resistance is sufficiently low that the bulk resistivity controls the distribution of etching current. However, when the rate of supply of holes to the surface is low, due for example to strong N-type doping of the semiconductor and to the absence of irradiation, the flow of holes to the surface is diffusion-limited and the etching resistance of the surface may be sufficiently large to require substantially higher resistivities of electrolyte for any given degree of localization than would be expected on the basis of the bulk resistivity alone.

In jet-electroplating, a similar criterion for localized plating holds, provided that the metal ion concentration is sufficiently small that the size of the deposit is controlled principally by the distribution of the plating currents, rather than by spontaneous deposition of the metal. Under such conditions, to secure best localization and a well-defined deposit, the resistivity of the plating solution should be greater than that of the semiconductive body, and preferably at least from two to five times greater. The precise value required depends upon the supply of conduction-band electrons available at the surface since plating depends upon the discharge of metal ions by electrons from the semiconductor. This supply, in turn, is limited principally by the bulk resistivity of the semiconductor when the semiconductor is N-type or strongly irradiated. However, for P-type material with low illumination, the flow of conduction-band electrons to the surface is at least in part diffusion-limited, and plating is not only difficult but requires a higher-than-normal ratio of resistivities of the electrolyte to the semiconductor.

In a preferred embodiment of our invention, the stream of electrolyte is a jet of well-defined form impingent upon a semiconductive surface, and the semiconductor is made positive during etching and negative during plating. The mechanical action of the stream, in constantly replenishing the fresh electrolyte in contact with the semiconductor and in removing the etched-away material, facilitates the etching action and provides a clean, firm and smooth surface which is suitable for plating upon when so desired, and yet is undisturbed and unstressed. Etching takes place principally in the region of highest electrical current flow, namely at the point where the jet or stream impinges or contacts the semiconductive material. Although the high current at this point tends to produce local heating of the semiconductor, this tendency is opposed by the cooling action of the liquid jet. By using sufficiently fine jets and controlling the conductivity of the electrolyte, sharply delineated contours may be obtained upon or within the semiconductor. Similarly, the positions and configurations of metals deposited upon the semiconductor by a jet of electroplating solution may be accurately controlled.

In one form our method may be employed to provide a small metallic contact upon an extremely thin region of semiconductive material, as is desired for example in the fabrication of junction transistors, analogue transistors and in the area-contact amplifier of our above-cited copending application. This may be accomplished in accordance with the invention by applying an electrolytic jet to one surface of the body with the electrical current polarity which produces etching, continuing etching to produce a depression of increasing depth in a semiconductor until only an extremely thin region of semiconductor remains under the depression, and then reversing the polarity of current flow to deposit a metal contact upon the thin region of semiconductor remaining. For further control of the contact size, the contact may be etched back either by a chemical etchant or by further application of the etching jet.

Although the various operations as described above can be performed by means of a single stream of electrolyte, we have found that a pair of opposing jets can be used particularly effectively in producing the three types of semiconductive device mentioned hereinbefore, so that both sides of the semiconductive body are treated simultaneously by the streams with resultant improvements in geometry as described hereinafter in detail. Furthermore, by providing relative motions of specified types between jet and semiconductor, we provide configurations of special utility, such as flat-bottomed, steep-sided pits and circular grooves which are produced by rotational motions of semiconductor relative to jet.

Other objects and features of the invention will be more fully comprehended from a consideration of the following detailed description in connection with the accompanying drawings in which:

FIGURE 1 is a schematic representation of apparatus suitable for practicing our method in one form;

FIGURES 2A to 2L are fragmentary cross-sectional views of semiconductive structures in various stages of our novel processes, while

FIGURE 3 is a schematic representation of a modification of the apparatus of FIGURE 1 suitable for applying our method in another form;

Figure 2A:
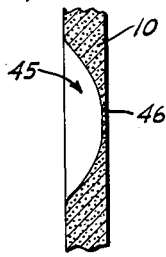

In the interest of clarity of exposition, the invention will first be described as it may be used in several specific applications, after which there will be set forth in detail the factors governing the selection of conditions to produce rapid, uniform, smooth and localized jet-electrolytic etching and plating of various materials.

The invention will first be described as it may be applied to provide a metallic deposit of predetermined size and location upon a region of greatly reduced thickness in a semiconductive body, as shown for example in FIGURE 2C. In this case the region of reduced thickness is that beneath a depression in one surface of a semiconductor which extends nearly to the opposite surface thereof. While such a metal-semiconductor structure may in some instances be used as a rectifier of the area-contact type, or after heating as a P-N junction rectifier, it is especially useful as a structure from which amplifying devices may be produced by further processing as will be indicated hereinafter.

As an example of one specific process for producing such a structure utilizing N-type germanium, the apparatus of FIGURE 1 may conveniently be used. It will be understood that this figure is for the purpose of explanation only and the various components thereof are not necessarily to the same scale; in particular, the semiconductive wafer 10 is greatly magnified in the interest of clarity. Shown therein is the semiconductive wafer 10 having soldered or otherwise ohmically connected thereto a metallic base tab 11, which in turn is held by a support stand 12 in a position to permit impingement of wafer 10 by an electrolytic jet 13. Wafer 10 may be composed of N-type germanium having a resistivity and hole-lifetime suitable for use in the semiconductive device ultimately to be fabricated. In the case of the area-contact amplifier or the junction transistor, germanium resistivities of from 0.1 to 10 ohm-centimeters are common, with minority-carrier lifetimes within a range extending from a few microseconds to several hundred microseconds. Methods for producing such materials being well known in the art, it will be unnecessary here to describe in detail the requisite metallurgical processing.

To form the jet 13, a glass nozzle 15, having a substantially circular aperture, may be supplied with a suitable electrolyte 16 from reservoir 17 by means of pump 18 and appropriate glass and plastic tubing substantially as shown. Suitably, but not necessarily, reservoir 17 is arranged to catch and permit recirculation of the electrolyte impingent upon wafer 10. A parallel-connected section of tubing 20 with the associated adjustable pressure valve 21 may also be provided as a bleeder arrangement for permitting fine control of the electrolyte pressure at the nozzle 15. The vertical tube 23 is conveniently provided as a pressure gauge, the height of the liquid within tube 23 indicating the electrolyte pressure. A porous glass filter 26 may also be inserted in the electrolyte supply system prior to nozzle 15 to prevent foreign matter from entering the nozzle 15 and interfering with the formation of a uniform jet. Preferably all elements coming in contact with the electrolyte are substantially non-reactive therewith, to avoid contamination of the solution.

Electric current may be supplied between the jet 13 and the wafer 10 by means of potential source 30, double-pole double-throw switch 31, inert electrode 32, leads 33 and 34 and current-regulating resistors 35 and 36. Electrode 32 is preferably non-reactive with the electrolyte and may suitably comprise a stainless-steel ribbon for example. Switch 31 is preferably arranged as shown so that in one position, namely the downward position in FIGURE 1, electrode 32 is made positive with respect to wafer 10 and current of a magnitude controlled by the potential of source 30 and the magnitude of resistor 36 flows from jet 13 to wafer 10. In the opposite or upper position of switch 31, electrode 32 is negative with respect to wafer 10 and a current determined by the potential of source 30 and the magnitude of resistor 35 flows from wafer 10 to jet 13.

To provide the desired electrolytic etching of germanium, the electrolyte 16 may comprise any of a large variety of readily ionizable metal salts or acids. Although either aqueous or non-aqueous electrolytes may be used, we prefer to employ an aqueous solution such as sodium nitrite, sodium chloride, potassium nitrate, sodium or potassium sulphate, nitric acid or any of many others. However, when as in the preferred embodiment of the invention it is desired to utilize the same electrolyte which is used for etching to electroplate a metal upon wafer 10, the electrolyte will ordinarily be a salt of the metal to be deposited. For example, if gold is to be deposited then the electrolyte may be gold chloride. When indium is to be deposited, as is preferred in certain forms of semiconductive amplifiers, the electrolyte may suitably comprise indium trichloride or indium sulphate. For accurate control of the configuration of the plated contacts, a solution providing low throwing power is desired, and hence the metal ion concentration should be relatively low. On the other hand, it is also desirable that the conductivity of the solution be sufficiently high to provide relatively rapid etching. We therefore prefer to add an acid to the electrolyte until the desired conductivity is obtained. However, if the conductivity of the solution is made greater than that of the germanium, etching occurs in regions remote from the immediate vicinity of the point of impingement of the jet, and the accuracy of delineation of the desired contour of the germanium is greatly reduced. A compromise value of electrolyte conductivity, providing rapid yet accurate etching, is therefore preferably employed. Considerations relating to the effects of using various etching and plating solutions will be set forth fully hereinafter.

As an example only, in making semiconductive amplifiers in the manner described herein the germanium wafer 10 may be of N-type germanium having a hole-lifetime of the order of 100 microseconds and a resistivity of about one ohm-centimeter, while the electrolyte may be a solution of indium trichloride in a 0.09 normality solution, with hydrochloric acid added thereto to provide a pH of approximately 1.5. Jet 13 may be substantially circular in cross-section with a diameter of about 3 mils, for example, and the etching current under these conditions may be adjusted to one milliampere.

To operate the apparatus of FIGURE 1, the pump 18 is turned on and the wafer 10 placed in front of nozzle 15 in a position to be impinged by jet 13, the jet being pointed in the direction in which etching is to occur, in the present case normal to wafer 10. With the switch 31 in its neutral position, the valve 21 may then be adjusted to provide proper jet pressure as indicated by the height of the electrolyte in tube 23. This pressure will ordinarily be such that the flow of the electrolyte in the vicinity of the point of impingement of jet 13 upon wafer 10 is substantially laminar so as to avoid formation of globules of electrolyte in the vicinity of the impinged point. The jet should also be well-defined when, as in the present instance, relatively sharp contours are desired. An electrolyte pressure of about 15 pounds per square inch is typical. Next the arm of switch 31 may be thrown to its upper position in which wafer 10 is positive with respect to jet 13, resulting in electrolytic etching of the surface of wafer 10 upon which the jet impinges.

The electrolytic current during etching may be controlled through selection of the value of resistor 35. Typical currents range from 1 to 3 milliamperes for wafers having resistivities of from 1 to 7 ohm-centimeters. However, the rate of etching is also to some extent a function of the illumination of the point of impingement of the jet upon the wafer. It has been found that without illumination, etching of the N-type germanium is substantially slower, and in some cases more diffuse. It is believed that the effect of the illumination is to produce positive and negative current carriers in the region of the semiconductor near the impingement point, thereby permitting substantial currents to flow into wafer 10. However, we have found that the value of illumination employed is not critically dependent upon ambient illumination if auxiliary illumination substantially higher than ambient is employed. Typically one may employ a microscope lamp 40 placed about 6 inches from wafer 10, having an 18 watt bulb and an appropriate lens for directing the light therefrom upon the surface of the wafer to be etched. The illumination under these conditions is about 550 lumens per square foot, and with illumination of this approximate magnitude the exact intensity of the auxiliary light is not highly critical.

The etching operation may then be continued until only an extremely thin region of semiconductor remains under the jet. When this configuration has been achieved, the switch 31 may be thrown to the neutral position or, if it is desired to plate a metal thereon, to the downward position.

FIGURE 2A indicates the form of the wafer 10 upon the completion of the jet etching, showing the nearly hemispherical depression 45 and the thin region 46 of semiconductive material remaining beneath the depression. It will be understood that this and the other drawings of FIGURE 2 are not necessarily to scale, particularly as to the minimum thickness of semiconductor remaining under depression 45.

There are a variety of methods by which one may determine the appropriate time to discontinue the etching operation in order to leave an extremely thin region of semiconductor. One method is to observe the semiconductor from the side opposite the jet, terminating the etching when the light from a lamp such as 40 can be seen through the semiconductive material to an extent determinable by experience. It is also possible to utilize wafers of semiconductive material of such accurately controlled dimensions that a predetermined etching time may be used for each wafer. A third method, which we prefer for the present purpose, is first to etch a test hole in the wafer at a point adjacent that at which the thin laminal region is to be provided, noting the time at which perforation of the wafer first occurs, and then to move the wafer slightly to an adjacent position and etch for a few seconds less than has been determined to be necessary for perforation. This method is best employed when wafer 10 has substantially exactly plane-parallel major surfaces.

From the semiconductive structure of FIGURE 2A, a P-N-P transistor structure may be produced by applying pellets of indium metal to the bottom of depression 45 and to the immediately opposite surface of laminal region 46, and then heating the assembly to diffuse some of the indium into the laminal region. The latter steps being well known in the art, it will not be necessary to describe them in detail herein except to note that the problems in applying such conventional methods are obviously substantial in the present instance due to the difficulty of applying the indium pellet to the thin region 46 without damaging the crystalline material. For these and other reasons we prefer to utilize a further feature of our invention in accordance with which the indium metal may be deposited upon the bottom of depression 45 simply, quickly and without danger of fracturing or distorting the surface of the material.

Figure 2B:
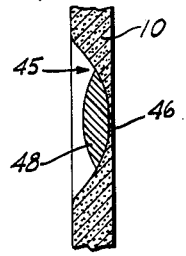
Figure 2C:
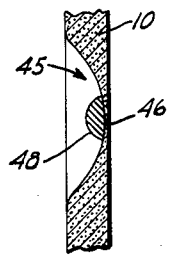

Accordingly, after the etching operation has been completed as indicated hereinbefore, switch 31 may be thrown to its downward position in which indium is electroplated upon the bottom of depression 45 from the indium trichloride solution, the plating current being controlled by selection of the value of resistor 36. A typical value of plating current which we have found convenient is 0.7 milliampere, applied for approximately one to two minutes. The resultant structure is shown in FIGURE 2B, wherein 48 represents a dot of indium metal electrodeposited upon the bottom of depression 45.

The wafer may next be subjected to chemical etching in a solution suitably comprising 48% hydrofluoric acid and an equal amount of 69.8% nitric acid diluted two-to-one with water. This chemical etching is useful in removing any indium which may have splattered onto regions of the wafer remote from the bottom of depression 45, and also in "etching back" the indium dot to provide the small diameter desired. For example, it will generally be desirable in the case of high-frequency transistors to restrict the diameter of the dot to the substantially flat-bottomed portion of depression 45, which may readily be done by dipping in the aforementioned chemical etching solution until the desired indium dot diameter is obtained. A typical configuration after "etching back" is shown in FIGURE 2C, where the diameter of the dot 48 may be about 2 mils.

From a semiconductor of this configuration having the indium dot in contact therewith at the desired location and with the desired dimensions, a P-N-P transistor may be formed by applying an indium pellet to the surface of the germanium immediately opposite the indium dot 48, by means of a conventional jig, and heating the assembly in conventional manner to alloy the indium with the germanium and produce a pair of opposing substantially planar diffused junctions. We have found that, when the indium metal is deposited by the above-described etching and plating process, its normal tendency to contract into a ball upon heating is substantially reduced apparently because it wets the germanium surface when so applied. Accurate control of the area of the diffused junction is therefore obtained.

The single-jet method described above may also be employed to construct the aforementioned area-contact amplifier, in which the emitter, and in some cases the collector element as well, comprise an area-contact. This may be accomplished by using the contact between wafer 10 and electrode 48 as the emitter of minority-carriers, and applying the jet with the current polarity necessary for plating to the opposite surface of region 46 to deposit a collector electrode. However, in making the area-contact amplifier we prefer to employ the modification of our method now to be described, which may also be used in part to produce P-N-P transistors.

Figure 2D:
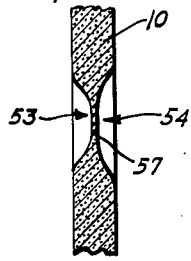
Figure 2E:
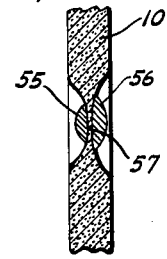
Figure 2F:
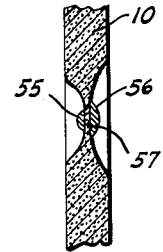

Referring now to FIGURE 3, there is shown a modification of the apparatus of FIGURE 1 to provide impingement of wafer 10 by a pair of opposed jets of electrolyte. It will be seen that in this arrangement a second nozzle 50 is connected in parallel with nozzle 15, by means of appropriate glass tubing 51, so as to provide a second jet 52 impingent upon wafer 10 directly opposite jet 13. When used to form conventional P-N-P transistors, the switch 31 of FIGURE 1 is first turned to its upper, or etching, position and electrolytic jet etching is allowed to proceed until the semiconductive wafer of FIGURE 2D is obtained, comprising a pair of opposing depressions 53 and 54 separated by an extremely narrow laminal region of semiconductor. Methods for determining the proper time for cessation of etching may be similar to those described previously herein. Switch 31 may then be placed in its downward, or plating, position, thereby to deposit the indium dots 55 and 56 upon the bottoms of depressions 53 and 54 respectively as shown in FIGURE 2E. Following this, the wafer may be dipped into a suitable chemical etch to etch back the indium dots to the desired small diameter of about 2 mils, as shown in FIGURE 2F. To produce the conventional P-N-P transistor, the device of FIGURE 2F may then be heated for a relatively short period of time to produce the desired diffused junctions therein.

When utilized to produce the area-contact amplifier described in our cited copending application, the apparatus of FIGURE 3 is caused to etch a pair of opposing depressions in the semiconductive material, as shown in FIGURE 2D, by means of the jets 13 and 52 until only an extremely thin partition 57 of the order of 0.2 mil thickness remains between the bottoms of the depressions, at which time the polarity of switch 31 is reversed to plate indium substantially immediately upon the plane-parallel bottom portions of the depressions. After this, the dots of indium may be etched back chemically to the desired size. Typically the indium contact formed by electrode 55, and used as a minority-carrier emitter, will be slightly smaller than the collector contact provided by electrode 56, to assist in efficient minority carrier collection, and depression 54 is then preferably made slightly larger than depression 53. Such differences in diameter of depression and contact may be realized by providing a jet 52 having a diameter somewhat larger than that of jet 13. Typically the diameter of electrode 56 may be about 3 mils after chemical etching.

Whether the structure of FIGURE 2D is utilized as the semiconductive body of a P-N-P transistor or of the area-contact semiconductive device described above, its fabrication by the double-jet method possesses the advantage that the bottoms of the depressions 53 and 54 are substantially flatter than those obtained by the simple single-jet system shown in FIGURE 1. This we believe is due to the fact that the rate of etching tends to decrease as the two surfaces impinged by the opposing jets approach each other very closely. The double jet method also has the apparent advantage that both emitter and collector may be provided simultaneously, which contributes to the extreme simplicity of the method.

By employing relative motion between jet and semiconductor, a variety of other useful configurations of semiconductor and/or metallic electrodes may be obtained. As an example, our method will now be described as it may be employed to produce monopolar, or analogue, transistors. This general class of transistor is now well known, and utilizes a configuration of semiconductor which causes current carriers to flow between two connections to the semiconductor by way of a so-called gate region wherein the conductivity of the semiconductor can be varied by means of varying potentials applied to the control electrode or gate. The gate is a rectifying surface surrounding a small volume through which the current carriers must flow to travel from one connection, called the source, to the second connection, called the drain. In the past, the rectifying surface has been a P-N junction, which is operated with reverse bias so as to produce an adjacent region depleted of current carriers to an extent dependent upon the potential applied to the gate. However, we have found that a metal-to-semiconductor area contact may also be used to provide the rectifying surface. In either case, the more accurately the configuration can be controlled to confine the current flow to the immediate vicinity of the gate, the greater is the gain of the transistor.

Figure 2G:
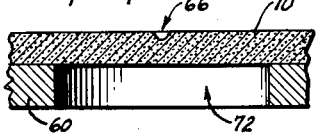
Figure 2H:
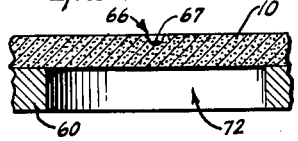
Figure 2I:
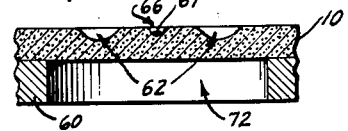
Figure 2J:
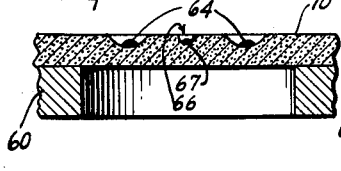
Figure 2K:
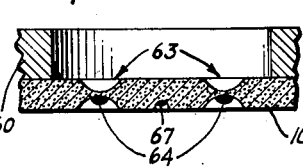
Figure 2L:
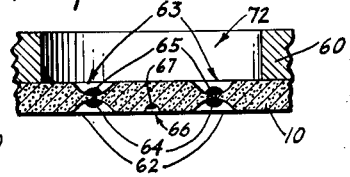
Figure 2M:
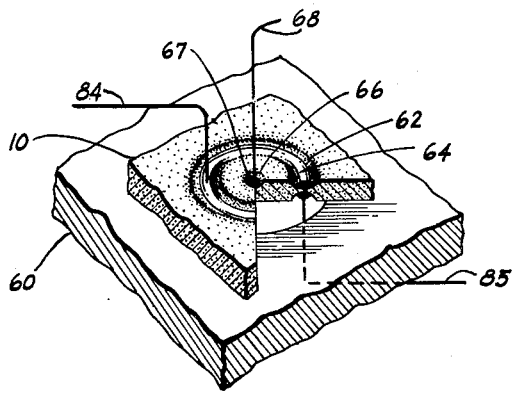
FIGURE 2M is a fragmentary perspective view of the novel ring-type analogue transistor produced by our methods and shown in FIGURE 2L.
Figure 4:
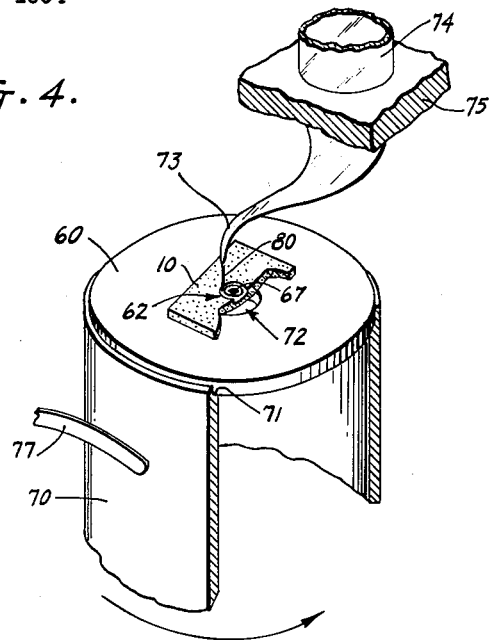
FIGURE 4 is a fragmentary perspective view of simplified apparatus for producing the device of FIGURE 2M in accordance with the invention.

Referring now to FIGURE 4, the apparatus shown therein in simplified form may be used to fabricate an analogue transistor of the type shown in its various stages of production in FIGURES 2G to 2M. As shown in FIGURES 2L, 2M and 4, this transistor comprises a wafer 10 of semiconductive material soldered to a metallic supporting disc 60, which serves as the source connection. Wafer 10 has a pair of opposing and aligned circular grooves 62 and 63, one in each of the opposite major faces thereof. These grooves are sufficiently deep that only an extremely thin ring of semiconductor material remains between the bottoms thereof. Upon the bottoms of these grooves are rings 64 and 65 of metallic material such as indium or zinc, which pair of rings together serve as the gate electrodes. A dimple 66 and a metallic deposit 67 therein may provide a convenient drain electrode, suitably contacted by a spring lead 68.

Referring now especially to the apparatus for fabricating this device shown in FIGURE 4, a suitable wafer 10 of semiconductive material soldered to supporting disc 60 may be pressed into one end of rotatable metallic cylinder 70, an internal shoulder 71 providing peripheral support for disc 60. Disc 60 preferably contains an aperture 72 beneath the wafer 10, thus exposing a portion of the underside of the wafer. A fine nozzle 73 is supplied with electrolyte by way of a suitable tube 74 and is supported by adjustably positionable support member 75. It is understood that the electrolyte and wafer 10 are supplied with appropriate electric currents as in the arrangement of FIGURE 1, the latter by way of brush contact 77, cylinder 70 and disc 60.

To fabricate an analogue transistor by our method, wafer 10 is rotated in a plane parallel to its major surfaces by axial rotation of cylinder 70, which in turn may be rotated by any means such as a motor-driven belt (not shown). A fine jet 80 is then directed upon the wafer 10 at the center of rotation thereof and current is passed between wafer and jet in the direction and for a time sufficient to produce a central dimple 66 as shown in FIGURE 2G, which is typically 1 mil wide and 0.2 mil deep, but is not critical as to its dimensions. Although not essential, the metallic deposit 67 shown in FIGURE 2H may then be plated onto the bottom of dimple 66 by reversing the electrolytic current for a short period of time.

Next the nozzle 73 is moved away from the axis of rotation of wafer 10 a distance equal to the desired mean radius of the circular groove 62 in the final transistor, and current is passed in the direction to produce etching while the wafer 10 is rotated until the groove 62 is formed, as shown in FIGURE 2I, having a depth which may conveniently equal about one-half the thickness of wafer 10 but is not critical. The direction of current flow is then reversed and rotation continued until the metallic ring 64 is deposited upon the bottom of groove 62, as shown in FIGURE 2J.

While the speed of rotation is not critical, we have found that superior results may be obtained with relatively high rotational velocities, 1200 revolutions per minute being typical. With such velocities, not only is substantial uniformity of treatment of various portions of the rings assured, but the centrifugal forces generated are sufficient to throw off excess electrolyte which may otherwise tend to accumulate on the wafer surfaces and adversely affect the desired localization of etching action particularly when the jet is applied from above as in FIGURE 4.

Next disc 60, carrying wafer 10, may be reversed in position in the end of cylinder 70 so that the portion of the underside of wafer 10, exposed by the aperture 72 in disc 60, is in position to be impinged by jet 80 with the jet in the same position as during formation of groove 62. Cylinder 70 and wafer 10 are then rotated as before, and jet 80 is applied with the electric current in the direction to produce etching. This action is continued until the groove 63 is formed directly opposite groove 62. The depth of groove 63 is such as to leave an extremely small region of semiconductor between it and the bottom of groove 62. Preferably the semiconductor thickness at this point is a small fraction of a mil. Determination of the time at which to terminate etching may be accomplished by methods such as those described in connection with FIGURE 1. Upon the cessation of etching, the current is again reversed to deposit metallic ring 65 upon the bottom of groove 63, after which the unit is removed from cylinder 70 and dried. Spring wires 68, 84 and 85 may then be applied to drain electrode 67, and rings 64 and 65 respectively as shown in FIGURE 2M.

To produce the junction type of analogue transistor, the assembly, comprising wafer 10 and metal rings 64 and 65 thereon, is heated to alloy the metal with the semiconductor and form a pair of opposing annular-ring-like P-N junctions of close geometric spacing. However, since the contacts between the electrodeposited rings and the semiconductor may themselves comprise rectifying contacts, we have found that this is not necessary in certain instances provided that the separation of the rings 64 and 65 is sufficiently small. For example, indium metal deposited upon N-type germanium immediately after etching in the manner specified provides the desired rectifying contact, and, by means of the above-described techniques, gates using such surface contacts may be made with spacings sufficiently close to provide a high degree of control of the source-to-drain current. Typical ring spacings for the area-contact type of analogue transistor are 0.2 to 0.6 mil.

The analogue transistor just described may also be made by impinging a pair of opposed jets upon opposite sides of a rotating wafer. Furthermore, any of the semiconductive devices thus far described may also be made by causing the jet or jets to move translationally or angularly while holding the semiconductor stationary so as to trace out the desired geometric path on the semiconductor. In other instances special etched or plated patterns may be produced by moving both jet and semiconductor.

It will be understood that an analogue transistor of the concentric ring type may employ as the gate a single ring situated at the bottom of a groove extending to within a fraction of a mil of the opposite surface of the semiconductor.

One configuration of special utility in semiconductive devices is a depression or pit having a substantially flat bottom and relatively steep sides. A transistor comprising an appropriate metal plated upon the bottoms of a pair of such depressions is characterized by a substantially plane-parallel emitter and collector, yet has relatively low base resistance. This shape can be produced by using a single jet having a diameter small compared with the diameter of the pit to be formed, and moving the jet during electrolytic etching so as to cause it to scan and to excavate the desired steep-sided pit. As an example, the apparatus of FIGURE 4 may be adjusted so that the center of jet 80 is displaced from the axis of rotation of wafer 10 by a distance less than the diameter of the jet, and etching current may then be applied while wafer 10 is rotated. The result of this operation is to produce a pit in wafer 10 having a diameter greater than that of jet 80 and with sides substantially steeper than would be obtained by the simple application of an axially-centered jet of sufficient size to produce the same diameter of pit without relative motion.

While rotational motions are particularly convenient to apply in many instances, other motions may also be utilized when appropriate. For example, in producing analogue transistors for either the junction or area-contact types, vibratory motions of jet relative to wafer may be applied to produce rectifying regions extending across opposite surfaces of the semiconductive wafer between source and drain. This may conveniently be accomplished by reciprocating the wafer between a pair of opposed jets, such as are shown in FIGURE 3 for example, during the etching and plating processes.

Figure 5:
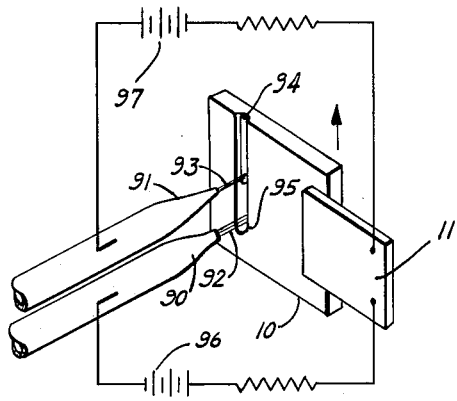
FIGURES 5 and 6 are schematic representations of apparatus suitable for practicing our invention by means of a plurality of electrolytic jets.

It will be understood that, although use of the same jet of one electrolyte for both etching and plating is particularly convenient in many applications, separate jets may also be employed for these two operations where it appears advantageous to do so. For example, as shown in FIGURE 5, a pair of nozzles 90 and 91 may be arranged to direct a corresponding pair of jets 92 and 93 upon a wafer 10 of semiconductive material at spaced points thereon, while relative motion is provided between jets and wafer such that the point of impingement of jet 91 follows the same path on wafer 10 as that taken by jet 90. For example, to produce a metallic deposit 94 upon the bottom of a straight groove 95, wafer 10 may be moved in a direction parallel to a line joining jets 92 and 93, as indicated by the direction of the arrow in FIGURE 5. A source 96 may then provide a potential difference between jet 92 and ohmic-connection tab 11, of such polarity as to produce electrolytic etching of the wafer by jet 92, while another source 97 supplies a suitable potential to jet 93 to cause this jet to deposit an appropriate metal upon the bottom of the groove carved out by jet 92. In this instance the velcity of motion is preferably sufficiently slow that the desired depth of groove and thickness of plating are produced during a single traversal of the wafer by the jets. A structure suitable for use in an analogue transistor may be made in accordance with this method by reversing wafer 10 and repeating the process to provide a similar structure in the opposite surface thereof, or by a pplying a similar pair of jets to the opposite surface of the wafer and treating both surfaces simultaneously. With this method, care should be taken in the spacing and orientation of the jets and wafer and in the selection of the electrolyte and semiconductor materials, that the etching solution does not remove the subsequently-plated metal.

By using different jets for etching and plating, more ready control may be exerted of such factors as the size of the plated region relative to the etched region, and the nature of the electrolytes selected for plating an etching. For example, in fabricating silicon transistors, the etching jet may conveniently be an aqueous solution of sodium fluoride, while the plating jet is a non-aqueous solution of zinc chloride in ethylene glycol as will be described more fully hereinafter.

Figure 6:
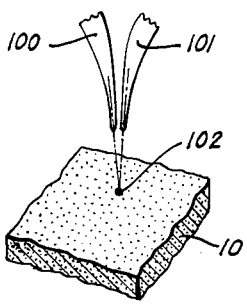

The use of separate jets for etching and plating is not limited to the case in which relative motion is provided during etching and plating. For example, apparatus as represented in FIGURE 6 may be employed to direct two separate jets alternately upon substantially the same region of a semicondutive body. Thus nozzles 100 and 101 may be closely spaced at a slight convergent angle so that the jets from each impinge the same point 102 on wafer 10. By first turning on the etching jet and then the plating jet, a structure similar to that of FIGURE 2B may readily be provided.

Before discussing some of the variations of our novel process which may be employed in various applications thereof, there will be described those principles which we believe control the etching and plating action and in terms of which the proper adjustment of the several parameters of the process may readily be expressed and comprehended.

The factors affecting jet electrolytic etching and plating of semiconductive materials may for the present purposes conveniently be divided into two aspects, first those factors which determine whether etching occurs smoothly and at a satisfactorily high and predictable rate, and secondly those determining whether the etching and/or plating action is sufficiently localized, i.e. confined to the area at or near the region of impingement by the jet upon the semiconductive surface.

Considering first the factors affecting the rate and nature of the etching and plating without particular regard to the degree of localization thereof, we have found the following considerations to be helpful in establishing proper operating conditions. First, the rate of etching or plating at a given portion of the surface of a semiconductor depends primarily upon the amount and type of electrical current-carriers flowing through that surface region. Thus the deposition of the metal electrolytically upon the semiconductor surface depends upon the neutralization of the positive charge upon the metal ions in the solution by conduction-band electrons flowing from the surface of the semiconductor. In the case of etching, it is necessary for the semiconductor atoms to free themselves from their crystalline valence bonds and attain a positive charge, in order to go into ionic solution; this in turn requires that a supply of holes, that is, absences of electrons from the valence band of the semiconductor, exist at the surface of the semiconductor. Therefore, it is generally necessary to provide at the surface of the semiconductor an adequate electron current in the case of plating and an adequate hole current in the case of etching. When the latter conditions are met, smooth, uniform and predictable etching and plating may be obtained provided that the proper solutions and currents are utilized. It will be understood that even where the supply of the appropriate current carrier is not sufficient to support the desired type of etching or plating, it is still sometimes possible to obtain etching or plating by supplying extremely high voltages and currents, but that under such operating conditions the etching or plating will generally be rough and non-uniform, and to some extent unpredictable as to the rate and type of action exerted, due to factors such as decomposition of the electrolyte, release of large quantities of gas at the semiconductive surface, and heavy oxidation or "burning" of the surface. It is the former type of smooth, uniform etching and plating which is desired for most of the applications described hereinafter, and for this reason such processes will be referred to hereinafter as normal etching and/or plating, while the latter type of operation will be described as high voltage etching and/or plating.

We have also found that during the etching and plating of semiconductors, potential barriers may exist at the surfaces to be etched or plated. For example, we have found that with N-type germanium, and to a lesser extent with P-type germanium, the solutions normally utilized for etching or plating tend to produce, upon contact with the germanium surface, a potential barrier for electrons which during etching is biased in the reverse direction, and during plating is biased in the forward direction. However, this barrier is not generally a controlling factor in the case of germanium, since it is a barrier primarily to electrons and is forward-biased in the case in which electron-flow at the surface is important, namely during plating. In the case of silicon, barrier effects again do not generally exert a controlling influence on jet-etching and plating.

More important are the effects of conductivity-type and irradiation upon etching and plating. Considering first N-type germanium, a low-resistivity body of such material by its very nature possesses a large number of available conduction-band electrons as the majority carrier, but only relatively few holes under normal conditions in which external irradiation is not applied. Because of the dearth of available holes at the surface of the N-type germanium body and the limitations placed on the flow of such carriers to the surface by the diffusion process, etching in the absence of illumination proceeds at an extremely low rate. In order to provide the supply of holes necessary at the germanium surface to effect substantial low-voltage etching, we have found that irradiation of the region to be etched, as by visible illumination, is highly desirable and in many cases is a practical necessity.

As an example only, we have found that when jet-etching 1 ohm centimeter N-type germanium with a 0.1 normal solution of potassium chloride, relatively rapid, smooth etching is obtained with visible illumination of the order of 550 lumens/square foot, but when the illumination is reduced to substantially zero the etching rate falls by a factor of about four for the same total current. When the illumination is increased above 550 lumens/square foot to much higher values, the etching rate increases only slowly and the illumination is therefore not critical. Therefore, to provide uniform etching in normal ambient environments in which the illumination is subject to fortuitous variations, we prefer to apply a fixed, strong illumination of about 550 lumens/square foot to the region of jet impingement when etching N-type germanium. This illumination should contain substantial components having wavelengths shorter than about 1.8 microns so as to supply the energy required for an electron to jump the energy gap between the valence and conduction bands.

When etching P-type germanium, the density of holes and the rate at which they may be supplied to the surface is much greater, so that the rate of etching is affected to a much smaller extent by illumination. For example, with 5 ohm-centimeter P-type germanium, etching occurs in the dark at substantially the same rate as with illumination of 550 lumens/square foot.

The nature of the decrease in etching rate of N-type germanium in the dark has been determined by measuring the variation with voltage of the electrolytic current into 5 ohm-centimeter N-type germanium usining 0.1 normal $H_2SO_4$ as the electrolyte, comparing the current with the amount of material etched away, and performing similar experiments for the same arrangement with 550 lumens/square foot and for 5 ohm-centimeter P-type material, as follows.

With the N-type material, and etching in the dark, the total electrolytic current at first increased slightly as the voltage was increased above zero, then remained nearly constant as the voltage was increased through a second range, and finally, in a third range, increased quite rapidly in proportion to the voltage. The voltage was measured by means of a platinum wire of three mils diameter, placed about 40 mils from the semiconductor surface near the center of a jet of 18 mils diameter. Under these conditions the first range extended roughly from 0 to one-half volt, the second from one-half to about 8 or 10 volts, and the third range extended above 10 volts. In the second range of voltage, an extremely small amount of etching took place, corresponding to limitation of the etching by the slow rate of diffusion of holes through the body to the surface. In the third range, etching occurred at a moderate rate, but the coulombic efficiency was only about 25%, the remainder of the current going into the release of oxygen, indicating that a large voltage was produced across the surface between electrolyte and semiconductor under these conditions.

With P-type germanium and no illumination, etching increased rapidly with applied voltage from nearly zero volts, and with a coulombic efficiency of about 100%. In this case the ample supply of holes provides efficient etching and such a low value of etching resistance that the voltage across the surface does not rise to that required for release of oxygen.

When the original experiment using N-type germanium was repeated with an illumination of about 550 lumens/square foot upon the region of jet impingement, the current and etching rate changed from that obtained with no illumination to substantially that obtained with the P-type material, indicating the effectiveness of illumination in supplying holes to the surface to be etched and in reducing the etching resistance of the surface.

To etch either N- or P-type germanium, any of a large variety of electrolytes may be used, including acid or basic solutions, and weakly or strongly ionized electrolytes. Nonaqueous electrolytes may also be used, such as zinc chloride or hydrofluoric acid dissolved in ethylene glycol, for examples.

In jet etching silicon, we have found that many of the problems in securing adequate etching arise from the strong tendency for silicon to form a coating of silicon dioxide on its surface. The electrolyte used for etching should therefore be one which is capable of preventing the accumulation of such a coating. It appears to be important to remove this oxide layer either immediately prior to or during the electrolytic etching, and to inhibit strongly its formation during etching. For this reason the fluorides have been found to be most successful as electrolytes for silicon. With P-type silicon, a preliminary chemical etch of HF plus $HNO_3$ is helpful in removing the oxide, and electrolytic etching may be accomplished using an electrolyte of between 0.2 and 0.4 normal NaF in water. To facilitate the etching, a small amount of HF may be added to the electrolyte, and illumination may be employed, but neither of the latter steps is essential.

In etching N-type silicon, conditions are more critical. Since it conducts principally by electrons, strong illumination is important for smooth and rapid etching; the illumination should contain substantial components having wavelengths shorter than about 1 micron in order to provide energies greater than the relatively large energy gap of silicon, and in general should be greater than in the case of germanium because of the lower equilibrium concentration of current-carriers therein. The electrolyte is preferably 0.2 normal NaF in water, plus sufficient HF to give a pH of three, although the HF component may be eliminated with some sacrifice of the smoothness of the etched surface. Sodium chloride has also been used in place of the sodium fluoride, but with poorer results. For etching solutions designed to permit both etching and plating, zinc fluoride may be used in place of NaF. A non-aqueous electrolyte comprising ethylene glycol plus about 10% HF by weight may also be used as an electrolytic etchant for silicon.

Considering now the factors which have been found important in depositing metals upon semiconductive bodies by our jet-plating process, the phenomena observed are explicable from the fact that plating requires discharge of metal ions in the solution by electrons from the semiconductor, and that the electrons ordinarily available for this purpose are the conduction band electrons. Satisfactory plating therefore requires an adequate rate of supply of electrons (i.e. conduction-band electrons) to the surface to be plated. For strongly N-type material, the plating current is therefore limited nearly entirely by the bulk resistivity of the body. However, as the conductivity is changed toward intrinsic, and thence toward more and more strongly P-type material without application of substantial external radiation capable of producing conduction-band electrons, the flow of electrons to the surface becomes limited more and more by the restrictions on flow imposed by the diffusion process of charge transportation through the body, resulting in a smaller and smaller rate of supply of electrons to the surface and a corresponding diminution of the rate of plating. However, by applying sufficient illumination, the rate of generation of electrons can be made great enough to support rapid and smooth plating.

In plating on germanium, any of a large number of metal salts may be used, dissolved in a suitable electrolyte which does not interfere with the plating action as by precipitating the metal for example. An excellent solution for plating 5 ohm-centimeter N- or P-type germanium is 0.1 normal indium sulphate plus sulphuric acid of between 0.1 and 0 normality. However, other solutions such as 0.1 normal zinc chloride in water, 0.1 normal antimony trifluoride plus 1 normal HF in ethylene glycol, or any of many more may also be employed.

In plating silicon, aqueous solutions such as 0.1 normal zinc chloride in water, or 0.1 normal indium sulphate in water are suitable for forming metallic deposits upon the surface, particularly as a preliminary to alloying the metal with the semiconductor to form a junction. However, when a rectifying area-contact in direct contact with the silicon is desired, as for the area-contact transistor mentioned hereinbefore, non-aqueous plating solutions have been found to provide rectifying contacts of longer life. Suitable solutions are 0.1 normal solutions of zinc chloride, antimony trichloride or antimony trifluoride in ethylene glycol, preferably applied immediately after immersion of the silicon body in an etch consisting of 4 parts 48.5% HF and 6 parts 69.8% $HNO_3$.

Turning now to the factors which determine the degree of localization of the etching and plating process, we have found that to obtain the desired concentration of etching near the center of the jet the effective resistance to the etching or plating currents flowing between anode and cathode by way of surface regions near the center of the jet must be low compared with the corresponding resistances of paths passing through the surface in regions more remote from the center of the jet, and further that the resistance for etching and plating currents may differ substantially from the ordinary ohmic resistance of such paths depending upon the nature of the semiconductive properties of the body to be etched. As has been pointed out hereinbefore, the distribution of the electrolyte upon the surface of the semiconductor is such that the resistance for plating or etching currents due to the electrolyte is less for paths entering the body near the center of the jet than for those entering at more remote points. However, the effectiveness of such differences in producing well-defined localization of the etching and plating to regions under or near the jet depends upon whether the etching or plating current is in large measure determined by the resistances in the electrolyte or whether such resistances are of minor importance in determining these currents. As an example, when the resistivity of the electrolyte is about 5 ohm-centimeters and the resistivity of the body 30 ohm-centimeters, no material localization of etching occurs, since the resistivity of the body is the principal determinant of the amount of etching current flowing. We have in fact found that for satisfactory localization the resistivity of the electrolyte should be greater than that of the body, and preferably at least two to five times greater.

We have found further that while the ordinary ohmic resistivity of the body is a suitable criterion of the resistance encountered by etching or plating current flowing through the semiconductive body when the body contains sufficiently large numbers of the current-carrier type (i.e. electrons or holes) required for the operation, in other cases the effective resistance of the body to etching or plating currents may be considerably greater than that indicated by the resistivity alone. In such cases the resistivity of the electrolyte should be even greater compared to that of the body, so that the resistance to the etching and plating currents in the electrolyte may exert a controlling effect in determining the etching or plating current flowing through the surface at any point.

More specifically, when jet-electrolytically etching P-type germanium having a resistivity of about 5 ohm-centimeters, using various normalities of KCl in water as the etchant and 1 milliampere of electrolytic current through a jet having a diameter of about 18 mils, it was found that when the resistivity of the electrolyte exceeded that of the body by a factor in a range from about 10 to 20, a well-defined etch-pit was produced in the region of jet impingement; when this ratio of resistivities was decreased into a range from about 10 to 6, the localization was noticeably poorer and the pit less well defined. Decreasing the ratio still further into a range from about 7 to 3, the etch-pit was very poorly defined and, in fact, barely discernible. As the resistivity ratio was reduced even further toward unity, the pit disappeared entirely. Illumination has little effect upon localization in this case, since there is an adequate supply of holes, which are the majority-carriers in this case. For example, illuminations of about zero, 550 lumens/square foot, and 1500 lumens/square foot do not produce marked changes in localization.

When similar etching is performed on a 5 ohm-centimeter N-type germanium body, substantially the same relation between the resistivity ratios and the degree of localization of the etching action exists, provided that the illumination of the etching surface region is sufficiently great (i.e. of the order of at least 1500 lumens/square foot). This occurs because the illumination produces hole-electron pairs in the germanium at the surface to be etched at a rate sufficiently high to provide the required hole current, and the etching current is then limited principally by the ohmic resistivity of the N-type material and the resistivity of the electrolyte. However, when the illumination is reduced the resistance to etching current increases greatly as described hereinbefore, with consequent decrease in localization for any given resistivity ratio. For example, the degree of localization obtained for 5 ohm-centimeter germanium with an illumination of about 1500 lumens/square foot and a resistivity ratio of about two, will require a resistivity ratio of about four when this illumination is reduced to 550 lumens/square foot. On the other hand, only slight improvements in localization can be obtained by increasing the illumination above 1500 lumens/square foot.

When the body to be etched is replaced by 36 ohm-centimeter germanium, with illumination of the order of 550 lumens per square foot, localization as a function of resistivity ratio is not greatly different from that for P-type etching, and its sensitivity to variations in the degree of illumination is intermediate that of the P-type material and that of the lower-resistivity N-type materials.

Considering now more particularly the factors affecting jet-electrolytic plating of semiconductors, it is often important in this case to control the concentration of the metal ions in the electrolyte so as to limit the spontaneous deposition of the metal to the desired region. The extent of such deposition depends upon the metal involved, gold and silver, for example, exhibiting this tendency to a marked degree. However, with most metals the concentration of metal ions can be reduced sufficiently to inhibit deposition beyond the region under the jet.

As an example of the effects of resistivity of electrolyte on the localization of plating, 0.1 normal zinc chloride may be used to jet-plate a dense, well-defined metal dot 20 mils in diameter upon 5 ohm-centimeter P-type germanium using a jet of 18 mils diameter, a current of one milliampere and 550 lumens/per square foot falling on the surface to be plated. As KCl is added to this electrolyte to decrease the resistivity thereof, the dot becomes less well-defined, and metal deposits over a greater and greater area. When the added KCl is zero, the ratio of the resistivity of the electrolyte to that of the semiconductor is about 19, and a dense, well-defined dot is obtained. When by addition of the KCl the ratio of resistivities is decreased to about 6, the plating is still well-defined, but upon further decrease of the ratio to about 2.7 some spreading of the dot and diffuseness at the periphery appears. At a resistivity ratio of about 1.8, the deposit has the form of a dense dot in the region of the original well-defined dot, but is surrounded by a region of lighter plating extending over an area about six times greater than that of the original dot.

When plating is performed on N-type material such as germanium, and the region plated is well illuminated, e.g. with 550 lumens per square foot, substantially the same dependence upon resistivity ratio is obtained. However, when the illumination is reduced, plating becomes difficult and diffuse with resistivity ratios of about 3 which would give satisfactory localization on P-type material.

While the jet-plating of well-defined, accurately-located metallic deposits upon semiconductive surfaces is useful for many purposes, several of which have been mentioned hereinbefore, we have found the process especially valuable in constructing the area-contact transistor, not only because of the high-frequency operation made possible by the microscopically precise techniques described herein, but also because the jet-plating process has made possible the production of rectifying area-contacts with a degree of reproducibility not heretofore obtainable with known processes, such as bath plating or evaporation. Although not wishing to be bound by any particular theory of why this is so, we believe that this high degree of reproducibility is caused by the characteristic of the rapidly-flowing liquid of the jet in continuously applying to the semiconductive surface the same solution, namely that which comprises the bulk of the electrolyte, rather than permitting local reaction products or environmental contaminants to alter the nature of the solution at the surface of the semiconductor.

Having described hereinbefore in detail a specific process for making an area-contact transistor by our novel process, in the interest of complete definiteness there will now be described a specific process for fabricating a silicon area-contact transistor in accordance with our invention.

A blank of P-type silicon having a resistivity between 1 and 20 ohm-cms. and a lifetime greater than 10 microseconds is cut into wafers 20 mils thick, the orientation of the crystalline structure being of little importance. These wafers are then lapped to 10 mil thickness and diced into rectangular blanks 80 mils by 160 mils. The blanks may then be chemically etched in so-called CP-4, an etchant having a constitution of 15 cc. 48.5% HF, 25 cc. 69.8% $HNO_3$, 15 cc. 99.8% acetic acid and 10 drops bromine. This chemical etching is continued until the blanks have a thickness of approximately 3 mils, after which they are rinsed in distilled water.

The base tab is affixed in the following manner. A nickel tab 5 mils by 65 mils by ¼ inch is tinned on one side of one end, using pure tin solder and Divco No. 335 flux. A blank is placed against the tab in a carbon jig, and the assembly heated to 900° C. for one minute in the presence of helium. The assembly is then cooled at 200° C. per minute until room temperature is again reached, at which time the blank with the nickel tab soldered thereto is removed from the jig, washed in distilled water, dried, and coated with a suitable resist such as polystyrene cement over the tinned area, to isolate this area from the solutions used in the etching and plating operations which follow.

In the etching step, there are employed a pair of glass nozzles forming a pair of corresponding jets of electrolyte directed against opposite surfaces of the silicon blank, these nozzles having inside diameters of about 10 and 12 mils respectively, the distance between the end of each nozzle and the surface of the silicon blank suitably being about one-fourth inch. An electrolyte suitable for this step is a 0.4 normal solution of sodium fluoride in water, ejected from the nozzles at a pressure of approximately 8 pounds per square inch. During this process a suitable power supply maintains the semiconductive blank positive with respect to the jet, and the regions of impingement of the two jets upon the silicon blank are illuminated strongly, as by directing a standard 30 watt microscope lamp upon each surface from a distance of about 3 inches. Under these conditions, the sodium fluoride solution electrochemically etches the silicon blank in the regions directly under the two jets. The bias applied between the jet and the silicon blank is controlled to allow approximately 5 milliamperes of current to flow.

Etching is continued until the desired thickness of the semiconductive body is obtained. A convenient indication of the thickness is the color of light transmitted through the body. This method of thickness termination is described in detail in the copending application Serial No. 424,704 of T. V. Sikina, filed April 21, 1954, now U.S. Patent No. 2,875,140, and entitled "Method and Apparatus for Producing Semiconductive Structures." To provide a body thickness of about 0.3 mil, etching is discontinued when light transmitted through the thinning portion of the blank changes from a deep red to an orange color at which time the bias supply circuit is opened and etching is terminated. The diameters of the craters thus formed by the 10 and 12 mil jets are approximately 25 and 30 mils respectively. The time ordinarily required for this etching operation, beginning with a silicon blank approximately 3 mils in thickness, is of the order of 3 or 4 minutes.

The blanks are then prepared for electroplating by immersing them in a chemical etchant consisting of four parts 48.5% HF and six parts 69.8% $HNO_3$, for a period of about one second. After this etch, the blank is quickly rinsed in distilled water, dried, and placed between a pair of opposing nozzles from which jets of plating solution are ejected against the bottoms of the depressions formed in the silicon blank in the previous etching process. A suitable solution for the plating operation is a 0.1 normal solution of zinc chloride in ethylene glycol. Such a non-aqueous solution has been found to provide silicon transistors of longer life than are obtained with aqueous plating solutions. The strong illumination employed in the jet-etching step is preferably continued during plating.

The inside diameters of the plating nozzles may typically be 6 and 8 mils respectively, in which case sufficient positive bias is applied to the nickel tab so that the total current flowing through the solution is of the order of 0.5 milliamperes. Under these conditions, metallic deposits of zinc of about 12 and 15 mils diameter respectively will be plated upon the bottoms of the 25 and 30 mil diameter pits. With a plating time of about 1 minute, the dots will ordinarily be about 0.4 mil in thickness, which is suitable for present purposes.

After the above plating operation, the unit is removed from between the jets, rinsed in distilled water and immersed for 1 second in an etch consisting of one part 69.8% $HNO_3$, one part 48.5% HF and ten parts distilled water. Following this the unit is again rinsed in distilled water and dried.

The silicon blank may then be rinsed again in distilled water, and immersed for 1 second in a clean-up etch consisting of 3 parts 99.8% acetic acid, 1 part 69.8% $HNO_3$ and 1 part 48.5% HF. This results in cleaning of the surface of the silicon, reducing somewhat the size of the metal dot, and providing the proper surrounding surface adjacent the periphery of the dots so as to obtain the desired rectifying and injecting contacts.

Either prior or after the clean-up etch, the unit may be assembled into any suitable holder, and appropriate contacts applied, either by the spring contacting arrangement described hereinbefore, or in some cases by a quick soldering operation utilizing a small amount of heat briefly applied to the region between the contacting element and the deposited electrode.

As an example of one set of conditions suitable for etching and plating P-type germanium, accurate jet-electrolytic etching of 5 ohm-centimeter single-crystalline germanium may be accomplished using an electrolyte of 0.1 normal indium sulphate plus sulphuric acid between 0.1 and 0 normal. With a jet of 18 mils diameter, a jet pressure of about 10 pounds per square inch, and an electrolytic current of two mils, a smooth crater of about 25 mils diameter is obtained with ambient illumination of about 30 lumens per square foot and no auxiliary illumination.

To plate P-type germanium, the following conditions are suitable, as an example. Using the same solution of indium sulphate and sulphuric acid, the same 18 mil diameter jet, the same jet pressure of 10 pounds per square inch, a plating current of 1 milliampere and an illumination of 550 lumens per square foot, a well-defined dot of about 20 mils diameter is formed on the surface of the semiconductor. The contact may then be etched with a chemical etch of equal parts of HF, $HNO_3$ and $H_2O$, to clean the surface surrounding the dot.

In one specific example our method may be applied to the etching of N-type silicon by utilizing as the electrolyte a 0.2 normal solution of NaF in water plus sufficient HF to provide a pH of three. Using a pair of opposing jets having diameters of 6 and 8 mils respectively, an etching current of 4.5 mils, a jet pressure of 10 pounds per square inch and an illumination of about 1500 lumens per square foot from microscope lamps as sources, craters of about 12 and 15 mils diameter are obtained for the 6 and 8 mil jets respectively; with 6 minutes of etching, the craters will be about three mils in depth.

To jet-plate N-type silicon, an electrolyte of 0.1 normal antimony trifluoride plus 1 normal hydrofluoric acid in ethylene glycol may be used, with a jet diameter of 14 mils, a current of 0.1 milliampere applied for two minutes, and an illumination of 1000 lumens/square foot, to produce a plated dot of antimony 26 mils in diameter. This contact may be cleaned and etched back to 15 mils diameter by dipping in a solution of 8 parts $H_2O$, 2 parts $HNO_3$ and 2 parts HF for about a second. The contact may then be rinsed in distilled water to remove the etchant.

It has also been found that it is possible to use alternating current for either etching or plating. For example, using an 18 mil diameter jet, a 60-cycle sinusoidal current of 1 milliampere, and 550 lumens per square foot of illumination, N- or P-type germanium may be jet-etched locally using a 0.1 normal solution of $H_2SO_4$. Under these conditions, the positive cycle of the voltage on the semiconductor produces etching, while the negative cycle releases hydrogen. Similarly, N-type germanium may be jet-plated locally using 0.1 normal indium sulphate as the electrolyte, an 18 mil jet, room illumination of about 30 lumens per square foot and a 60-cycle current of about 1 milliampere.

Although it has been convenient to describe the invention with particular reference to specific embodiments thereof, it will be understood that it may be embodied in any of a wide variety of forms without departing from the spirit of the invention. For example, it will be apparent from the foregoing that the electrolytic jets may have any of various cross-sectional shapes such as elliptical or substantially linear for example, and that the various parameters such as electrical current, jet pressure, electrolyte constitution and type of relative motion between jet and semiconductor may each or all be varied between or during the processing steps. Similarly, in particular applications special arrays of jets may be provided and moved in suitably intricate patterns to provide the desired product.

We claim:

1. In the art of fabricating semiconductor devices, the method which comprises the steps of directing against a region of said body a jet of an electrolytic etchant, maintaining said body at a potential positive with respect to that of said jet until a depression is formed in said region of said body, terminating said etching prior to complete perforation of said body by said jet, applying an impurity substance to the bottom of said depression, and heating said substance to produce a rectifying junction in said body.

2. In the art of fabricating semiconductor devices, the method which comprises etching a depression in a body of semiconductive material by applying a jet of an electrolytic etchant to said body while maintaining said body positive with respect to said jet, terminating said etching prior to complete perforation of said body by said jet, and then forming an area-type rectifying connection to the bottom of said depression by applying a barrier-forming substance thereto.

3. In the art of fabricating semiconductor structures, a method for the localized removal of material from an N-type semiconductive body which comprises the steps of impinging a portion of said body with a jet of an electrolytic etchant while maintaining said body at a potential positive with respect to said jet and simultaneously focusing illumination onto said portion of said body, said potential, said body and said etchant being such that in the absence of said illumination a surface roughness is produced in said body portion, said illumination being sufficiently great to produce on said body portion a surface substantially smoother than that produced by said potential in the absence of said illumination.

4. A method in accordance with claim 3, wherein said focused illumination constitutes at least the principal illumination of said body portion.

5. In the art of fabricating semiconductor structures, a method for producing a depression in a body of semiconductive material comprising the steps of directing against said body a jet of electrolyte while passing a current between said jet and said body in a direction to produce etching, and simultaneously rotating said body rapidly through a plurality of revolutions about an axis substantially parallel to said jet.

6. The method of claim 5 in which said rotation is about an axis displaced from the center of the region of impingement of said jet upon said body.

7. In the art of fabricating semiconductor structures, the method of forming a rectifying connection to a predetermined region of a body of semiconductive material, comprising the steps of: electrodepositing a conductivity-determining metal upon said region of said body by forming a jet of an electrochemical metal-plating solution, applying said jet to said region of said body, and passing an electric current between said jet and said body in the direction to effect electrodeposition of said metal; and subsequently heating said electrodeposited metal to alloy it with said body in said region.

8. The method of providing an even, well-defined metallic deposit upon a predetermined surface region of a semiconductive body, comprising electroplating said deposit onto said surface region by applying to said region a jet of an electrochemical plating liquid while maintaining said region at a potential negative with respect to said jet, and simultaneously applying to said region sufficient illumination to provide to said region a current of charge carriers of the conduction-band electron type of approximately the same magnitude as the total current flowing between said jet and said body in said region in response to said negative potential.

9. A method in accordance with claim 8, in which said semiconductive body is of P-type material.

10. In the art of fabricating semiconductor structures, the method of applying substances to semiconductive materials comprising electroplating said substance onto a region of a semiconductive body by applying a jet of an electrochemical plating liquid containing ions of the substance to be applied while maintaining said region of said body negative with respect to said jet, and while simultaneously focusing illumination onto the region of said body impinged by said jet.

11. A method in accordance with claim 10, in which said semiconductive body is of P-type material and said focused illumination constitutes at least the principal illumination of said region.

12. In the art of fabricating semiconductor devices, the method of applying substances to bodies of semiconductive material which comprises electroplating a portion of a body of semiconductive material by impinging upon said body portion of a jet of an electrochemical plating solution containing ions of the material to be applied while maintaining said body at a potential negative with respect to said jet, and simultaneously rotating said body rapidly through a plurality of revolutions about an axis substantially parallel to said jet.

13. A method in accordance with claim 12, in which said rotation is about an axis displaced from the center of the region of impingement of said jet upon said body.

14. In the art of fabricating semiconductor devices of the type employing rectifying barriers in a semiconductive material, the method which comprises providing a smooth surface region in said body by electrolytic etching, applying to said region a jet of an electrolyte containing ions of a metal capable of producing a potential barrier in said body when alloyed therewith, while maintaining said body negative with respect to said jet to deposit said metal, and alloying said deposited metal with said body to form a rectifying connection.

15. A method in accordance with claim 14, in which said smooth surface region is provided by jet-electrolytic etching of said body.

16. A method in accordance with claim 15, in which the same jet is used for depositing said metal and for said jet etching, and in which the polarity of the potential of said body with respect to said jet is changed from positive to negative while said jet is in contact with said region.

17. In a method for fabricating semiconductor devices of the transistor type, the steps of electroetching a first region of a body of semiconductive material by impinging a jet of an electrolytic etchant against said first region while maintaining said first region of said body at a potential positive with respect to said jet, thereby to produce a first depression in said body; electroetching a second region of said body opposite said first region by applying a jet of an electrolytic etchant to said second region while maintaining said second region of said body positive with respect to said last-named jet, thereby to produce a second depression in said body opposite said first depression; terminating etching of each of said first and second depressions prior to complete perforation of said body; electrodepositing a metallic deposit upon the bottom of each of said depressions by applying to each of said depressions a jet of an electrochemical metal-plating liquid while maintaining said body negative with respect to said last-named jet; and alloying at least one of said metallic deposits with said body to provide rectifying connection to said body.

18. In a process for fabricating a semiconductor device, the steps which comprise forming an electrical connection to a semiconductive body by electroplating a metallic substance upon a portion of said body from a jet of an electrolyte impingent thereon and alloying said electroplated substance with said body portion.

19. In the art of fabricating semiconductor devices, a method for the localized electrolytic etching of a semiconductive body of N-type material which comprises the steps of impinging said N-type semiconductive body with a jet of an electrolytic etchant for said material while maintaining said body at a potential positive with respect to said jet, and producing a coulombic efficiency of about 100% for said etching by simultaneously applying light to said body in an intensity sufficient to supply, to the surface of said body impinged by said jet, a current of charge-carriers of the hole type, said current being approximately equal to the total electrical current flowing between said body and said jet of electrolyte in response to said positive potential.

20. In the art of fabricating a semiconductor device of the class in which the electrical properties of the device are affected by the shape and by the surface and bulk condition of a body of semiconductive material contained therein, a method for controlledly shaping a portion of such a body while providing said body portion with a smooth undistorted surface area and without adversely affecting the character of the interior of said body portion, which method comprises:

applying to said body portion of a jet of a liquid which is an electrolytic etchant for said material;

providing in said jet and in said body portion respective electrical potentials which differ in the polarity to make said body portion anodic with respect to said jet, whereby a current increasing with increases in the difference in said potentials is produced between said jet and said body and said body portion is etched selectively in the region of application of said jet;

said body and said etchant being such that for a fixed value of illumination of said body portion the smoothness of said etching is of high degree and remains substantially constant with increases in said current when said current has a value lying within a first range of values and being such that with said value of illumination said smoothness of etching is of lesser degree and decreases rapidly with increases in said current when said current has a value lying in a second range of values, all values in said second range being greater than all values in said first range, said difference in potentials provided during said application of said jet being such as to produce a value of said current in said first range;

said body portion being of a material for which the upper limit of said first range of values increases with illumination;

said difference in potentials provided during said application of said jet being such that said current is greater than the value of the upper limit of said first range in the absence of illumination but smaller than the value of said upper limit for a particular intensity of illumination; and applying said particular intensity of illumination to said body portion during said applying of said jet and said providing of said potentials, thereby to provide accelerated smooth etching of said body portion.

References Cited in the file of this patent
UNITED STATES PATENTS

| | | |
|---|---|---|
| 1,416,929 | Bailey | May 23, 1922 |
| 2,504,628 | Benzer | Apr. 18, 1950 |
| 2,602,763 | Scaff et al. | July 8, 1952 |
| 2,656,496 | Sparks | Oct. 20, 1953 |
| 2,694,040 | Davis et al. | Nov. 9, 1954 |
| 2,690,422 | Szekely | Sept. 28, 1954 |
| 2,741,594 | Bowersett | Apr. 10, 1956 |
| 2,767,137 | Evers | Oct. 16, 1956 |
| 2,783,197 | Herbert | Feb. 26, 1957 |

FOREIGN PATENTS

| | | |
|---|---|---|
| 335,003 | Great Britain | Sept. 18, 1930 |
| 464,112 | Great Britain | Apr. 12, 1937 |
| 763,863 | France | Feb. 19, 1934 |